(12) United States Patent
Lerner et al.

(10) Patent No.: US 10,759,157 B2
(45) Date of Patent: Sep. 1, 2020

(54) SYSTEMS AND METHODS FOR TRANSFERRING GRAPHENE

(71) Applicant: Nanomedical Diagnostics, Inc., San Diego, CA (US)

(72) Inventors: Mitchell Lerner, San Diego, CA (US); Deng Pan, San Diego, CA (US); Brett Goldsmith, San Diego, CA (US); Savannah J. Afsahi, San Diego, CA (US)

(73) Assignee: Nanomedical Diagnostics, Inc., San Diego, CA (US)

( * ) Notice: Subject to any disclaimer, the term of this patent is extended or adjusted under 35 U.S.C. 154(b) by 318 days.

(21) Appl. No.: 15/623,169

(22) Filed: Jun. 14, 2017

(65) Prior Publication Data

US 2017/0361599 A1  Dec. 21, 2017

Related U.S. Application Data

(60) Provisional application No. 62/350,637, filed on Jun. 15, 2016.

(51) Int. Cl.
| | | |
|---|---|---|
| *B32B 43/00* | (2006.01) | |
| *C01B 32/184* | (2017.01) | |
| *B32B 37/00* | (2006.01) | |
| *B32B 37/12* | (2006.01) | |
| *B32B 38/10* | (2006.01) | |

(52) U.S. Cl.
CPC .......... *B32B 43/006* (2013.01); *B32B 37/025* (2013.01); *C01B 32/184* (2017.08);
(Continued)

(58) Field of Classification Search
CPC .... B32B 43/006; C01B 32/194; C01B 32/184
See application file for complete search history.

(56) References Cited

U.S. PATENT DOCUMENTS

| 2,724,392 A | 11/1955 | Cooper |
| 3,951,681 A | 4/1976 | Shoemaker |

(Continued)

FOREIGN PATENT DOCUMENTS

| EP | 3472619 A1 | 4/2016 |
| EP | 3472855 A1 | 4/2019 |

(Continued)

OTHER PUBLICATIONS

Desai, S. et al., Gold Mediated Exfoliation of Ultralarge Optoelectronically-Perfect Monolayers, Adv. Mater. 25, 23 Mar. 2016, pp. 4053-4058.

(Continued)

*Primary Examiner* — Philip C Tucker
*Assistant Examiner* — John Blades
(74) *Attorney, Agent, or Firm* — Sheppard Mullin Richter & Hampton LLP (57) ABSTRACT

The present disclosure is directed towards systems and methods for transferring graphene from the surface of one substrate to another. In one particular embodiment, the graphene layer is grown on a surface of a first substrate, where the bottom of the first substrate is then affixed to the surface of a second substrate. The second substrate may include material made of a rigid or semi-rigid composition to provide structural support and backing to the first substrate. The graphene layer may then be delaminated from the first substrate and transferred to a target surface, such as the surface of an electronic device or biosensor.

8 Claims, 7 Drawing Sheets

(52) U.S. Cl.
CPC .............. *B32B 37/12* (2013.01); *B32B 38/10* (2013.01); *B32B 2457/00* (2013.01)

(56) References Cited

U.S. PATENT DOCUMENTS

| | | | |
|---|---|---|---|
| 9,349,825 | B2 | 5/2016 | Feng |
| 2002/0115025 | A1 | 8/2002 | Noda |
| 2006/0192811 | A1 | 8/2006 | Silverbrook |
| 2007/0177788 | A1 | 8/2007 | Liu |
| 2008/0251862 | A1 | 10/2008 | Fonash |
| 2012/0073976 | A1 | 3/2012 | Chen |
| 2012/0285527 | A1 | 11/2012 | Goldblatt |
| 2012/0295018 | A1 | 11/2012 | Noguchi |
| 2013/0099195 | A1 | 4/2013 | Seacrist |
| 2013/0182373 | A1 | 7/2013 | Yu |
| 2013/0217215 | A1 | 8/2013 | Ward et al. |
| 2014/0162433 | A1 | 6/2014 | Willner |
| 2014/0238873 | A1 | 8/2014 | Li et al. |
| 2014/0332141 | A1 | 11/2014 | Willner |
| 2015/0038378 | A1 | 2/2015 | Cheng et al. |
| 2015/0303059 | A1 | 10/2015 | Friedman et al. |
| 2015/0364567 | A1 | 12/2015 | Feng |
| 2015/0367622 | A1 | 12/2015 | Adachi |
| 2015/0371848 | A1 | 12/2015 | Zaretski et al. |
| 2016/0033448 | A1 | 2/2016 | Milgrew |
| 2016/0159064 | A1 | 6/2016 | Pizzocchero et al. |

FOREIGN PATENT DOCUMENTS

| | | | |
|---|---|---|---|
| WO | 2013043120 | A1 | 3/2013 |
| WO | 2015004274 | A1 | 1/2015 |

OTHER PUBLICATIONS

Microchemicals, Photoresist Removal, Nov. 7, 2013, p. 1, retreived from <https://microchemicals.com/technical_information/photoresist_removal.pdf> on Mar. 27, 2019.

Song et al., "Corrosion Protection of Electrically Conductive Surfaces," Metals, 2012, vol. 2, pp. 450-477.

Chen, E. "III. Wet and Dry Etching," Apr. 12, 2004, pp. 1-18; retrieved from <https://www.mrsec.harvard.edu/education/ap298r2004/Erli%20chen%20Fabrication%20III%20-%20Etching.pdf> on Aug. 14, 2017.

Samaterials, Advantages and Disadvantages of Graphene, Mar. 27, 2014, p. 1-18, retreived from <https://samaterials.wordpress.com/2014/03/27/advantages-and-disadvantages-of-graphene> on Mar. 27, 2019.

International Search Report and Written Opinion in International Application No. PCT/US2014/037704, dated Sep. 6, 2017.

International Preliminary Report on Patentability in International Application No. PCT/US2014/037704, dated Dec. 18, 2018.

International Search Report and Written Opinion in International Application No. PCT/US2017/037764, dated Sep. 6, 2017.

International Preliminary Report on Patentability in International Application No. PCT/US2014/037764, dated Dec. 18, 2018.

International Search Report and Written Opinion in International Application No. PCT/US2017/033769, dated Sep. 6, 2017.

International Preliminary Report on Patentability in International Application No. PCT/US2014/037769, dated Dec. 18, 2018.

Patent Cooperation Treaty, International Search Report for PCT/US2017/037701, dated Sep. 6, 2017, pp. 1-2.

Corning Museum of Glass, "What is Glass?", Dec. 2, 2011, p. 1, retrieved from http://www.cmog.org/article/what-is-glass on Nov. 22, 2017.

Jackson, "Wine Tasting: A Professional Handbook", Feb. 1, 2002, retrieved from https://books.google.com/booksid=nOz8XCvAS9EC&pg=PA191 on Nov. 22, 2017.

International Preliminary Report on Patentability in International Application No. PCT/US2017/037701, dated Dec. 18, 2018.

European Search Report in EP 17814101, dated Jan. 14, 2020.

European Search Report in EP 17814130, dated Jan. 10, 2020.

Supplemental European Search Report in Corresponding EP Application No. 17814101.6, dated May 18, 2020.

```
┌─────────────────────────────────────┐
│ GROW A GRAPHENE LAYER ON A SURFACE OF│
│       A GROWTH SUBSTRATE            │
│                105                  │
└─────────────────────────────────────┘
                  │
┌─────────────────────────────────────┐
│   AFFIX THE GROWTH SUBSTRATE ONTO A │
│      SURFACE OF TRANSITORY SUBSTRATE│
│                110                  │
└─────────────────────────────────────┘
                  │
┌─────────────────────────────────────┐
│     COAT THE GRAPHENE LAYER WITH A  │
│           PROTECTIVE COATING        │
│                115                  │
└─────────────────────────────────────┘
                  │
┌─────────────────────────────────────┐
│  DELAMINATE THE COATED GRAPHENE LAYER│
│       FROM THE GROWTH SUBSTRATE     │
│                120                  │
└─────────────────────────────────────┘
                  │
┌─────────────────────────────────────┐
│    TRANSFER THE COATED GRAPHENE ONTO A│
│             TARGET SURFACE          │
│                125                  │
└─────────────────────────────────────┘
                  │
┌─────────────────────────────────────┐
│   REMOVE THE PROTECTIVE COATING FROM│
│              THE GRAPHENE           │
│                130                  │
└─────────────────────────────────────┘
```

Figure 7 though not all, in other circumstances and occasions. It is intended that the scope of the patent shall cover these various combinations and embodiments and those other variations and modifications as will be understood by those skilled in the art.

SYSTEMS AND METHODS FOR TRANSFERRING GRAPHENE

CROSS-REFERENCE TO RELATED APPLICATIONS

This application claims the benefit of priority to U.S. Provisional Patent Application with Ser. No. 62/350,637 filed on Jun. 15, 2016, the contents of which are incorporated herein in their entirety.

TECHNICAL FIELD

The disclosed technology relates generally to transferring graphene from the surface of one substrate to the surface of another. More specifically, embodiments disclosed herein relate to systems and methods for transferring graphene for large scale manufacturing.

BACKGROUND

Graphene is composed of a single thin layer of carbon atoms that are bonded together in a repeating pattern of hexagons. Graphene has many extraordinary properties, which includes high mechanical strength, high electron mobility, and superior thermal conductivity. Because graphene is a great thermal and electrical conductor, graphene material is often used to construct graphene based biosensors, transistors, integrated circuited, and other devices.

While there has been much academic interest in the application and utilization of graphene, attempts to commercialize graphene production have largely failed. As such, much of the currently known techniques for handling and preparing graphene are limited to techniques that are only suitable for academic purposes and small-scale production, and thus fail to take into consideration manufacturing costs, product assembly requirements, and the need for long-term durability. Additionally, because graphene layers are often grown on thin sheets, transferring the graphene layer is often very difficult, especially since the thin sheet can easily wrinkle and bend upon touch and even upon exposure to the environment.

While current methods of transferring graphene typically dissolve the substrate on which the graphene layer is attached onto, this is not ideal because it dissolves the growth metal substrate and does not allow the growth substrate to be reused. This not only substantially increases manufacturing costs, but is also likely to leave a thin residue on the graphene layer since it is often difficult to completely dissolve the metal substrate. The remaining residue then leads to the contamination and lowers the quality of the graphene.

Another method of transferring graphene may utilize adhesive tape to detach the graphene from the growth metal substrate and to transfer it onto the necessary surface. While the complexity and cost of transferring graphene is low, this is not ideal for a commercial setting that requires a large scale and high yield production of graphene. As such, there currently is a need for improving the transfer of graphene for large scale manufacturing without damaging or contaminating the graphene.

BRIEF SUMMARY OF EMBODIMENTS

In view of the above drawbacks, there exists a long felt need to properly and effectively transfer a graphene layer from the surface of one substrate to another, where the process is reliable and suitable for large scale production.

The present disclosure is directed towards the method of transferring graphene from the surface of one substrate to another. In one particular embodiment, the graphene layer is grown on a surface of a first substrate, where the bottom of the first substrate is then attached to the surface of a second substrate. By way of example only, the second substrate may include material made of a rigid or semi-rigid composition so as to provide structural support and backing to the graphene layer. Some embodiments may further include delaminating the graphene layer from the first substrate and transferring the graphene layer to a surface of a third substrate, such as a surface of a sensor or electronic device to complete the graphene transfer.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The following description is not to be taken in a limiting sense, but is made merely for the purpose of describing the general principles of the disclosed embodiments. The present embodiments address the problems described in the background while also addressing other additional problems as will be seen from the following detailed description. Numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

Figure 1:
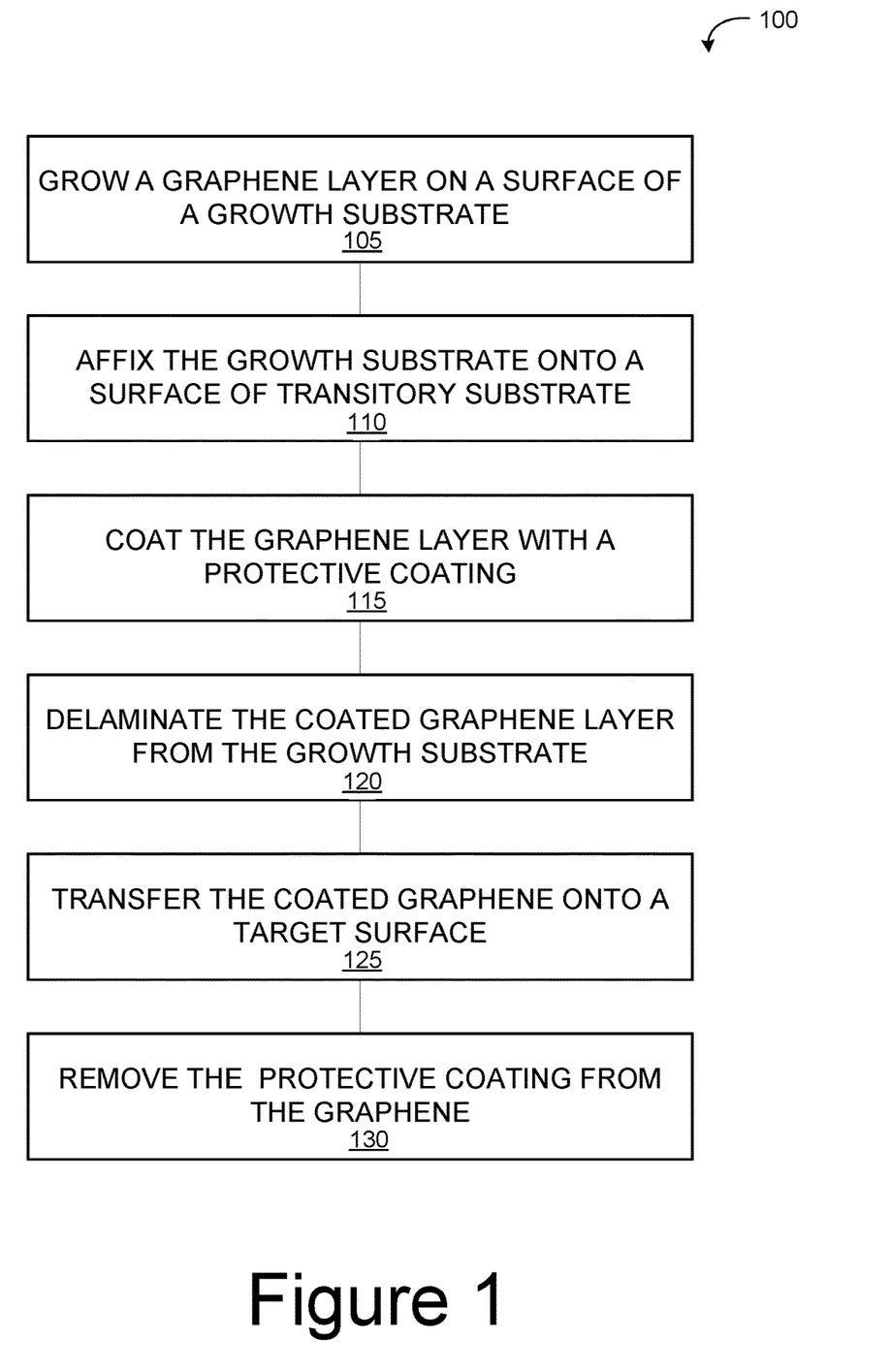
FIG. 1 is a flow chart illustrating a method for transferring graphene from a surface of a particular substrate to a surface of another substrate according to one embodiment.

Some embodiments of the disclosure provide method of placing a graphene sheet or layer from one substrate to another substrate. FIG. 1 is a flow chart illustrating a method for transferring graphene from a surface of one substrate to a surface of another substrate according to one particular embodiment. The method 100 may include growing a graphene layer on a growth substrate at step 105. For example, the growth substrate may include a thin metal foil made of copper, nickel, ruthenium, gold and the like. However, it should be noted that the growth substrate is not limited to a thin metal foil, and may include any growth substrate proper for growing a graphene layer. Additionally, the graphene layer grown on the growth substrate may be placed in a furnace or applied with high temperature to accelerate and ensure proper growth of the graphene layer.

The method 100 may further include step 110, which includes attaching the growth substrate with the grown graphene layer onto a the surface of a transitory substrate. Because the growth substrate may be a thin layer, such as a thin foil, the thin foil is likely to wrinkle and bend when being handled or exposed to certain environmental conditions. If the thin foil is compromised, the graphene on the thin foil will then be damaged and likely even contaminated. As such, by way of example only, attaching a transitory substrate to the thin foil may provide the necessary support, rigidity, and backing to prevent the thin foil from bending, wrinkling, or disturbing the graphene layer. By way of example only, the transitory substrate may include material made of glass, plastic, metal, silicon, silicon oxide, aluminum, aluminum oxide, and other insulators or metals The growth substrate may be affixed to the transitory substrate with the use of an adhesive. For example, an adhesive layer may be placed on the surface of the transitory substrate, such that the thin foil is then placed directly on top of the adhesive to properly affix the thin foil to the rigid substrate. In another example, the adhesive layer may also be placed on the surface of the thin foil opposite from the side with the graphene layer. The use and application of the adhesive layer may help ensure that the thin foil is smooth and unwrinkled so that the graphene layer is not damaged. Additionally, a nitrogen steam may be gently applied so as to further press the thin foil into the adhesive layer.

Next, the method 100 may further proceed to step 115, which may include depositing the graphene layer with a protective coating or layer to provide further structural support and a protective covering to the graphene layer. It should be noted that depositing layers onto the graphene sheet may include a wide range of techniques as appreciated by one of ordinary skill in the art, such as coating techniques, focused ion beam, filament evaporation, sputter deposition, and electrolysis by way of example only.

In some embodiments, the protective coating may be a polymer, such as Poly-methyl methacrylate (hereinafter "PMMA"), by way of example only. The PMMA coated graphene layer may then be cured under ambient conditions or via heat to sufficiently ensure that the PMMA adheres onto the graphene layer. Once the PMMA properly adheres onto the graphene layer, the graphene layer may be cut or stamped into the desired shape and dimension using a sharp-edged tool. However, the protective coating need not be limited to a PPMA polymer, and instead, may include any carbon backbone polymer to be used as a coating for the graphene layer.

Additionally, by applying a protective covering to the graphene layer, this allows the graphene to be handled by machinery and other manufacturing conditions without having to worry about contaminating or damaging the graphene layer.

The method 100 may further include step 120, which may include delaminating the graphene layer from the growth substrate, thus allowing the graphene layer to then be transferred to another surface, such as the surface of an electronic device by way of example only. To delaminate the graphene layer, the growth substrate may be connected to the anode of an electrochemical cell, where the cathode is then submerged in a conductive ionic solution to complete the circuit. By way of example only, the conductive ionic solution may include a sodium hydroxide solution that ranges from 0.05 to 3 molar concentration. However, the ionic solution need not be limited to a sodium hydroxide solution, and instead, may include other ionic solutions such as potassium hydroxide, hydrogen chloride, and the like. Additionally, the electrochemical cell may include a voltage source that is configured to generate 20-50 V. By applying potential to the electrochemical cell, hydrogen and oxygen bubbles may evolve at the electrodes, such that the bubbles are situated in between the growth substrate and the graphene layer. This may then cause the graphene layer with the protective coating to separate from the growth substrate, such that the graphene layer with the protective coating then floats to the surface of the ionic solution.

Next, the method 100 may proceed to step 125, which may include transferring the graphene layer with the protective coating onto the surface of a target substrate. For example, the surface of a target substrate may be the surface of an electronic device or biosensor by way of example only. However, it should be noted that the surface of a target substrate may be any surface that may receive and harbor a graphene layer. However, before placing the coated graphene layer on the surface of a target substrate, the graphene layer with the coated protective layer may first be washed in deionized water baths to remove any residual ions. The graphene layer with the coated protective layer may then be affixed to the surface of the target substrate via capillary forces. To further ensure that the graphene layer is properly and securely adhered to the surface of the target substrate, the graphene layer may be cured in ambient conditions from anywhere near 30 minutes to 24 hours to allow any remaining trapped water to dry out. This process of transferring graphene may be capable of transferring 99% of the graphene layer from the surface of the growth substrate to the surface of a new target substrate.

The method 100 may then proceed to step 130, which may include removing the protective coating on the graphene layer, such that only the pristine graphene layer is adhered to the surface of the target substrate. For example, the protective coating may be removed by utilizing an acetone wash, which leaves only the graphene layer on the target substrate.

Figure 2:
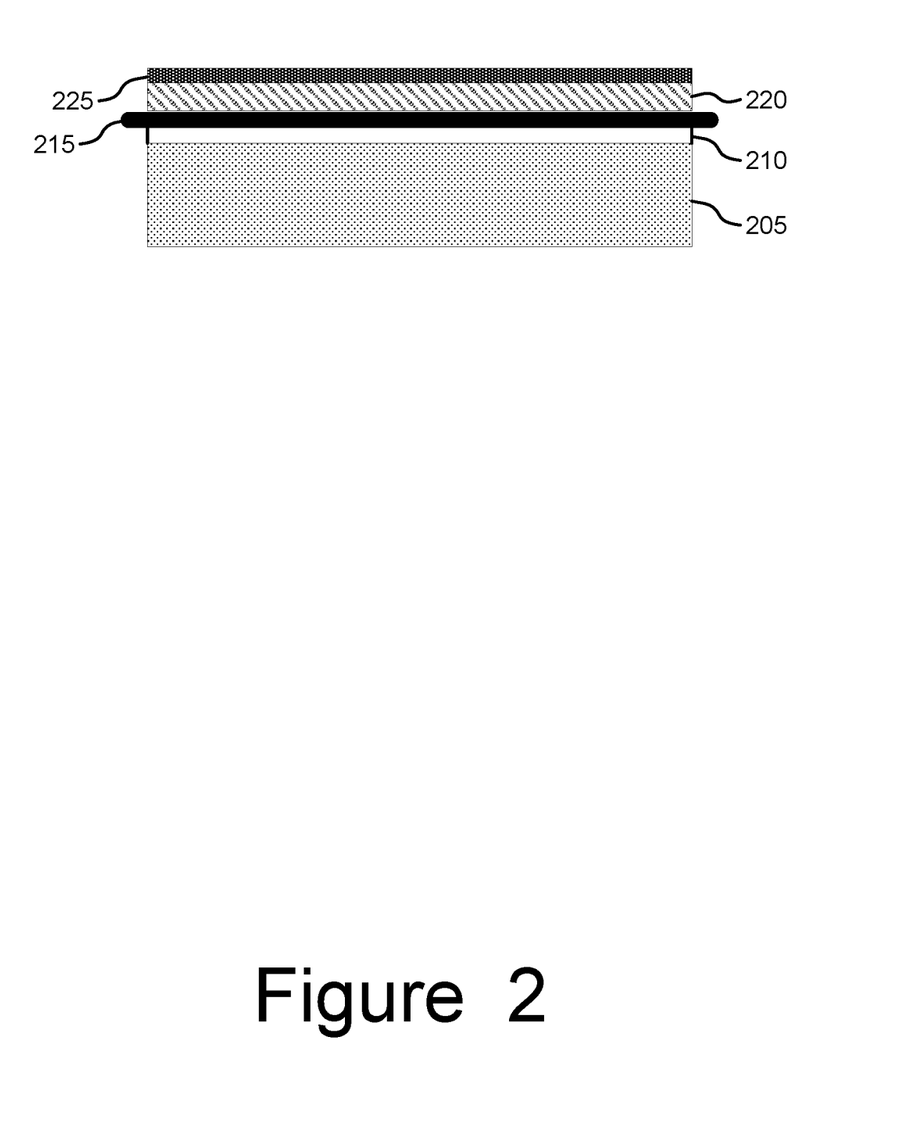
FIG. 2 is a diagram of a graphene layer on a surface of a particular substrate according to one embodiment.

FIG. 2 is a diagram of a graphene layer 220 supported by a transitory substrate 205 for transferring the graphene layer 220 according to one embodiment. As illustrated, the graphene layer 220 is grown on a growth substrate 215, which may include a thin metal foil made of copper or nickel by way of example only. The thin metal foil of the growth substrate 215 may also be affixed to the transitory substrate 205 so as to prevent the thin metal foil from bending or wrinkling when handling or transferring the graphene layer 220. To further ensure that the thin metal foil of the growth substrate 215 is properly flattened and affixed to the rigid substrate 205, an adhesive layer 210 may be applied so as to adhere the bottom of the growth substrate 215 onto the top surface of the rigid substrate 205.

Because the graphene layer 220 is exposed to the environmental conditions and is highly susceptible to contamination and damage, the graphene layer 220 may include a protective coating 225, such as PMMA polymer by way of example only. The coating may provide the necessary structural support and proactive covering to protect the graphene layer throughout the transfer process.

Figure 3:
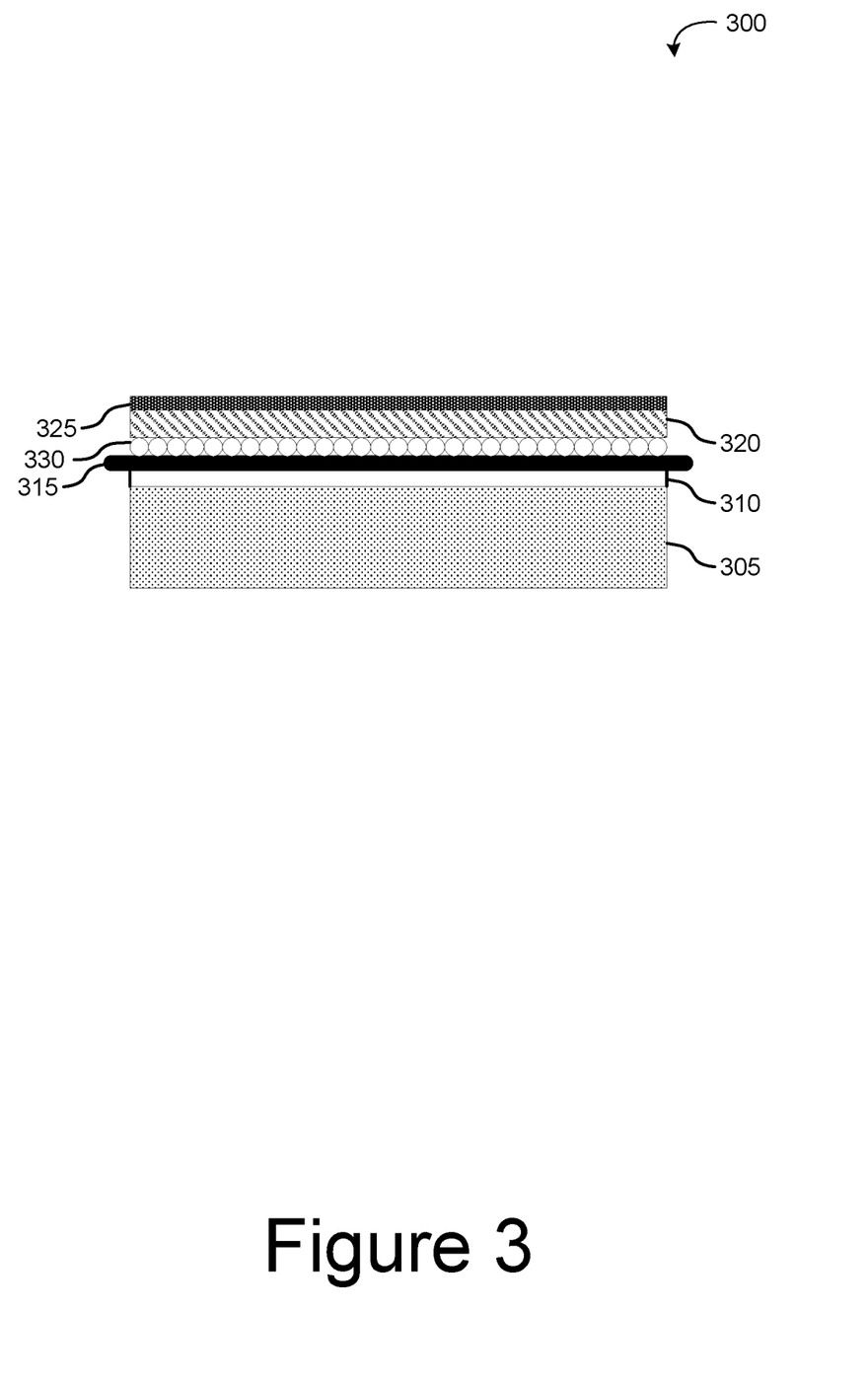
FIG. 3 is a diagram of a graphene layer on a surface of a particular substrate with bubbling to transfer graphene onto a surface of another substrate according to one embodiment.

FIG. 3 is a diagram of a graphene layer 320 on a surface of a growth substrate 315 with bubbling 330 present in between the graphene layer 320 and the growth substrate 315. Additionally, the graphene layer 320 may further include a protective coating 325 so as to protect the exposed portion of the graphene layer 320. Similar to FIG. 2, the growth substrate 315 may be affixed to a transitory substrate 305 via an adhesive layer 310, so as to prevent the growth substrate from bending or wrinkling when handling or transferring the graphene layer.

In order to transfer the graphene layer 320 onto a surface of another substrate, the graphene layer must first be detached from the growth substrate 315. To do so, an electrode potential may be applied so that the anode of an electrochemical cell is connected to the thin metal foil of the growth substrate 315 and the cathode is submerged in a conductive ionic solution to complete the circuit. By applying the potential, hydrogen and oxygen bubbles 330 may form in between the thin metal foil of the growth substrate 315 and the graphene layer 320. With the formation of the hydrogen and oxygen bubbles 330, the graphene layer 320 may be gently delaminate from the thin metal foil of the growth substrate 315. This allows the coated graphene layer 320 to detach from the growth substrate 320, thus allowing the graphene layer to then be placed on a surface of a selected target substrate.

Figure 4:
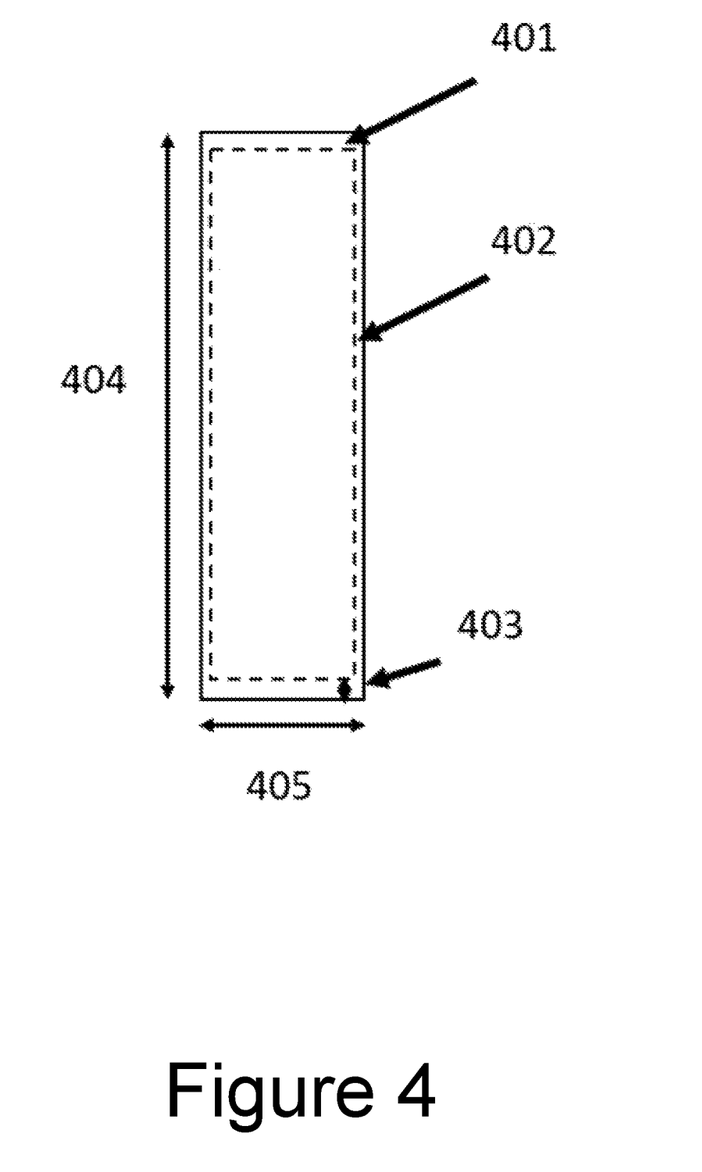
FIG. 4 is a diagram of a transitory substrate of one embodiment.

FIG. 4 is a diagram of a growth substrate 401 of one embodiment. As illustrated, the growth substrate 401 may include material made of copper or any other material suitable for growing a graphene layer. By way of example only, an embodiment may further include scoring the growth substrate with score marks 402 or windows on a surface of the growth substrate 401. The score marks 402 may be added at the surrounding edges of the growth substrate 401. The score marks 402 may be added to help guide the bubbles in between the graphene layer and the growth substrate 401 when the growth substrate 401 containing a graphene layer is submerged into a conductive ionic solution. Without the placement of the score marks 402, the bubbles are likely to aggregate at the outer edges of the growth substrate 401, which is not ideal and not likely to provide a clean delamination of the graphene layer from the growth substrate 401. Thus, by including the score marks 402 at the growth substrate 401, this allows the bubbles to more effectively penetrate and be situated in between the growth substrate 401 and the graphene layer, thus ensuring a gentle and full delamination of the graphene layer from the growth substrate 401.

By way of example only, the score marks 402 may be formed along the edges of the growth substrate 401, but not less than 1 mm from the edge on all sides of the growth substrate. Additionally, in other embodiments, the score marks 402 may be added along the areas where the edge of the graphene is to be situated on top of the growth substrate 401.

By way of example only, the growth substrate 401 may have dimensions where the length 404 of the growth substrate 401 may range from 1 inch to 12 inches. Additionally, in another example, the growth substrate 401 may have a width 405 that ranges from 1 inch to 6 inches. However, it should be noted that these exemplary dimensions are in no way limiting and may include any length 404 and width 405 as smaller and/or greater than one inch as appreciated by any one of ordinary skill in the art.

Figure 5:
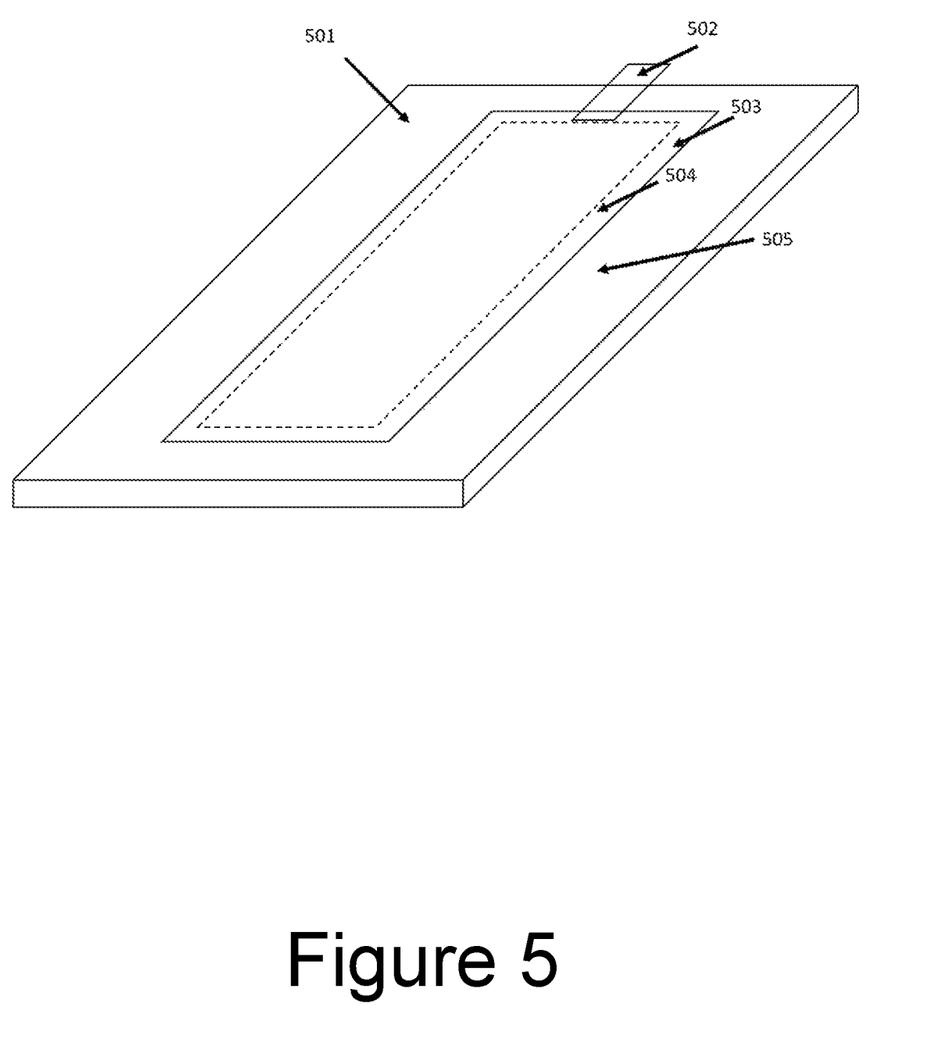
FIG. 5 is a diagram of a transitory substrate with a growth substrate attached according to one embodiment.

FIG. 5 is a diagram of a transitory substrate 501 with a growth substrate 503 deposited on top according to one embodiment. Here, the growth substrate 503 may be a thin metal foil that may easily be bent or wrinkled, which then will damage the graphene layer 502 grown on top of the growth substrate 503. As a result, the growth substrate 503 may be transferred onto a transitory substrate 501, where the transitory substrate 501 provides a supportive platform to protect the integrity of the growth substrate 503. Additionally, by way of example only, the transitory substrate 501 may have dimensions that ranges in 0.5 inches to 1 inch longer and wider than the dimensions of the growth substrate 503. This then allows for a personnel or machine to handle the transitory substrate 501 without having to touch or make contact with the graphene layer 502, thus further preventing the likelihood of contamination and damage to the graphene layer 502.

Furthermore, the transitory substrate 501 may include an adhesive layer 505 on top, where the adhesive layer 505 is strategically placed in between the top surface of the transitory substrate 501 and the bottom surface of the growth substrate 503. Again, the adhesive layer 505 may help ensure that the growth substrate 503 is smooth and unwrinkled so that the graphene layer growing on top is not damaged.

As discussed with respect to FIG. 4, the growth substrate 503 may include score marks 504 along the areas where the edge of the graphene is to be situated on top of the growth substrate 503.

Figure 6:
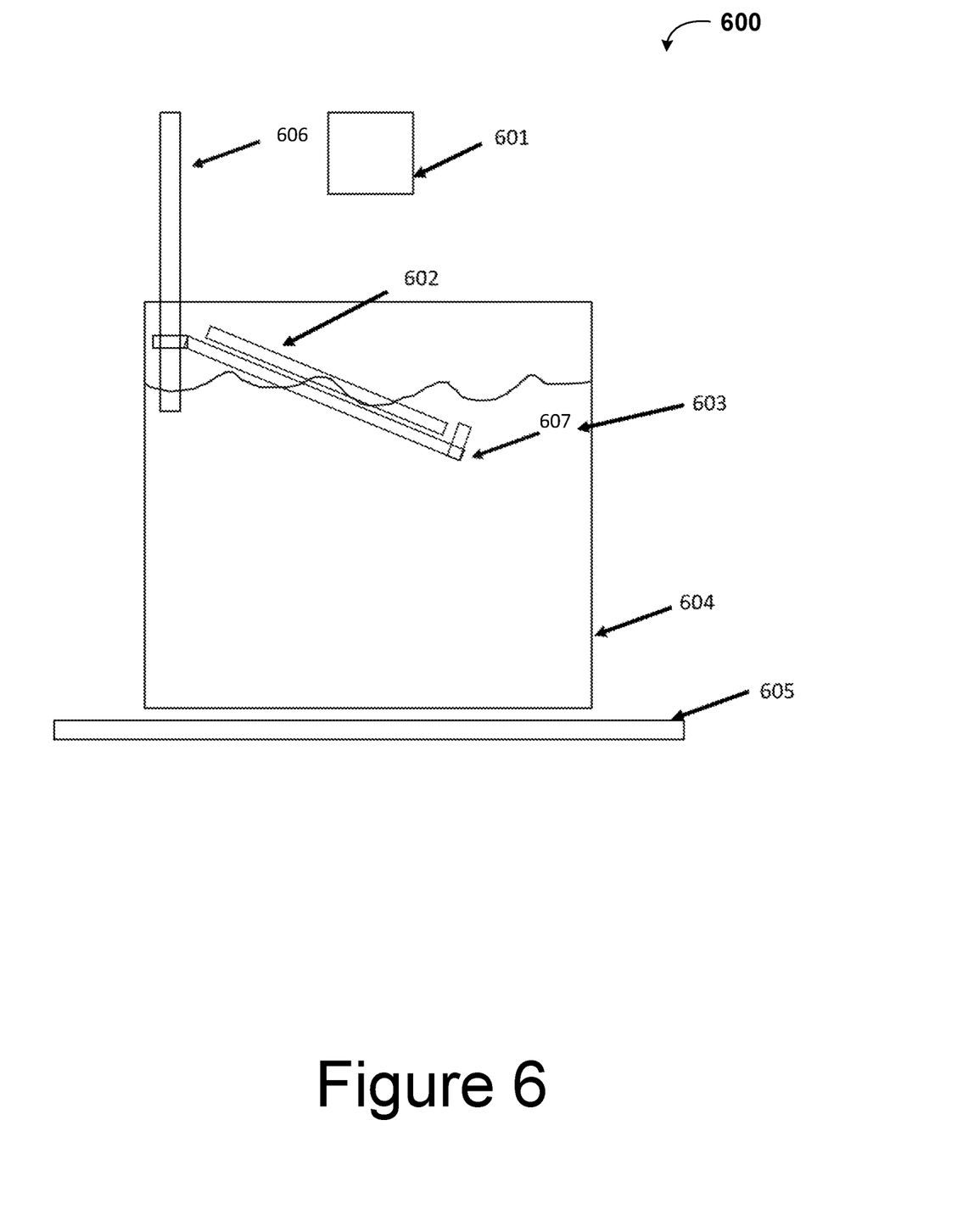
FIG. 6 is a diagram of a system for delaminating a graphene layer from a growth substrate according to one embodiment.

FIG. 6 is a diagram of a system 600 for delaminating a graphene layer according to one embodiment. Here, the system 600 may include a container 604 for holding conductive liquid 603 used to delaminate the graphene layer from a substrate 602, such as a growth substrate. As such, the substrate 602 may be immersed into the conductive liquid to begin the delamination by placing the substrate onto a platform 607 attached onto an arm 606 with an actuator and platform 607.

The linear actuator may allow for the platform 607 to proceed up and down the arm 606 at a controlled rate, thus allowing to control the submersion rate of the substrate 602 into the conductive liquid 603. By way of example only, the arm 606 may be configured so that the platform 607 has a steady immersion rate, where the platform with the graphene layer may enter and exit the solution at a steady rate ranging from 0.5 mm/s to 10 mm/s. By way of example only, the average entry and exit rate may be 2 mm/s. Additionally, by way of further example only, the immersion rate may correspond to a delamination rate, where the graphene is then properly and cleanly delaminated from the transitory substrate.

Figure 7:
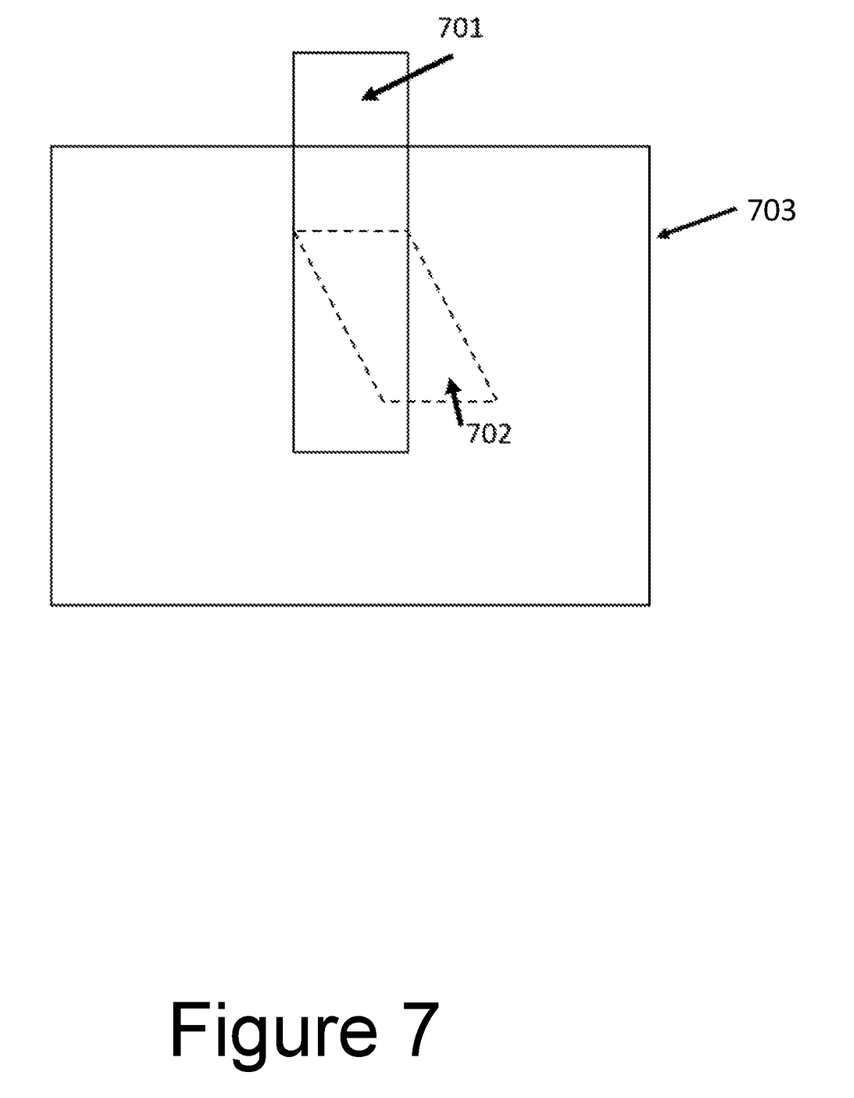
FIG. 7 is a diagram of a graphene layer delaminating from a substrate according to one embodiment.

Additionally, the entry and exit rate of the platform containing the substrate with the graphene layer may require close observation to determine if the graphene is properly and cleanly delaminating from the substrate 602. For example, if the entry of the substrate 602 is proceeding too quickly into the conductive liquid 603, the graphene layer may not properly delaminate from the substrate. The proper delamination of the graphene from a substrate is depicted in FIG. 7. As illustrated, graphene layer 701 is gently being separated from the growth substrate 702 when immersed in the container 703 filled with conductive solution.

However it should be noted that the platform need not be connected to an actuator to immerse the platform in and out of the conductive solution at a steady immersion rate. Instead, the platform may simply be placed in the conductive solution for a select period of time to delaminate the graphene from the transitory substrate. When the delamination is complete, the platform containing the graphene sheet and the transitory substrate was simply be taken out of the conductive solution.

As such, referring back to FIG. 6, some embodiments of the system may include a camera 601 directly on top of the container 604 to monitor the delamination of the graphene layer. Thus, a viewer may be able to monitor the delamination process via the camera feed provided by the camera 601. Furthermore, in other embodiments, the linear actuator may be connected to the camera 601, where the linear actuator is placed in feedback loop for automation.

The container 604 may also be placed on a colored background 605 for contrast. By providing a colored background 605, this may allow a viewer to quickly view and see the delamination of the graphene layer with ease. Additionally, to further distinguish the layers on the substrate, the temporary protective coating on top of the graphene may also be colored, which further allows the viewer to view the progress of the graphene layer being delaminated.

Additionally, this transfer process is not limited to the transfer of graphene. Indeed, this transfer process may also be applied to other low dimensional materials, that include, but are not limited to, carbon nanotubes, molybdenum disulfide, phosphorene, tungsten diselenide, and the like.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of transferring graphene comprising:
   growing a graphene layer on a top surface of a growth substrate;
   affixing the growth substrate onto a surface of a transitory substrate;
   scoring an outer edge of the top surface of the growth substrate with a plurality of score marks;
   immersing the growth substrate affixed to the transitory substrate in a conductive solution;
   electrifying the conductive solution to cause a formation of bubbles at least at the outer edge of the top surface of the growth substrate;
   delaminating the graphene layer from the growth substrate; and
   transferring the graphene layer onto a target surface;
   wherein the delaminating of the graphene layer from the growth substrate is facilitated by the formation of the bubbles.

2. The method of claim 1, wherein the growth substrate comprises copper.

3. The method of claim 1, wherein the transitory substrate comprises glass, plastic, metal, silicon, silicon oxide, aluminum, or aluminum oxide.

4. The method of claim 3, further comprising affixing an adhesive layer to the transitory substrate, and affixing the growth substrate to the adhesive layer.

5. The method of claim 1, further comprising depositing a protective coating on the graphene layer.

6. The method of claim 5, wherein the protective coating comprises a carbon polymer.

7. The method of claim 1, wherein the immersion occurs at a steady immersion rate.

8. The method of claim 7, wherein the bubbles cause the graphene to delaminate from the growth substrate at a delamination rate corresponding to the steady immersion rate.

\* \* \* \* \*